United States Patent [19]
Olson

[11] Patent Number: 6,036,166
[45] Date of Patent: Mar. 14, 2000

[54] CHAMBER VALVE

[75] Inventor: David L. Olson, Elk River, Minn.

[73] Assignee: IMI Cornelius Inc., Anoka, Minn.

[21] Appl. No.: 09/160,390

[22] Filed: Sep. 25, 1998

Related U.S. Application Data

[60] Provisional application No. 60/060,047, Sep. 25, 1997.

[51] Int. Cl.$^7$ ........................................................ F16K 7/04
[52] U.S. Cl. .................................. 251/7; 222/207; 222/214
[58] Field of Search .................................. 251/7; 239/119, 239/124; 222/109, 207, 214; 141/115, 116, 117

[56] References Cited

U.S. PATENT DOCUMENTS

| | | | |
|---|---|---|---|
| 3,212,671 | 10/1965 | Rock | 251/7 |
| 5,033,656 | 7/1991 | Blette et al. | 222/214 |
| 5,439,146 | 8/1995 | Niss | 222/207 |
| 5,551,599 | 9/1996 | Niss | 222/214 |

FOREIGN PATENT DOCUMENTS

| | | | |
|---|---|---|---|
| 3113345 | 10/1982 | Germany | 222/214 |
| 92/16450 | 10/1992 | WIPO | 222/214 |

*Primary Examiner*—Steven O. Douglas
*Assistant Examiner*—Tuan Nguyen
*Attorney, Agent, or Firm*—Sten Erik Hakanson

[57] ABSTRACT

A valve having a linear actuator operating a tube compression rod. The rod is held in a common axial orientation with a section of flexible tubing that runs through the valve and is rigidly held therein between the compression rod and a tube platen. The flexible tube section is fluidly connected on one end thereof to a pump that delivers a viscous material thereto from a source thereof. The opposite end of the flexible tube section is fluidly connected to a dispense point. In operation, the linear actuator is operable between an extended position wherein the compression rod moves to partially occlude or compress the flexible tube section against the tube platen, and a retracted position wherein the flexible tube section is not compressed. Dispensing of the viscous substance is commenced by actuation of a switch operating the pump. During operation of the pump, the chamber valve is in its extended position wherein the flexible tube section is partially occluded. When sufficient viscous substance has been dispensed, the pump is turned off. At the same time the chamber valve is operated to move to its retracted position. Such movement results in the flexible tube section moving to its non-occluded position whereby a suction force is applied to the viscous substance at the dispense point. As a result, a small volume of the viscous material is moved away from the dispense point in the reverse direction of its normal flow for preventing dripping thereof from the dispense point.

2 Claims, 3 Drawing Sheets

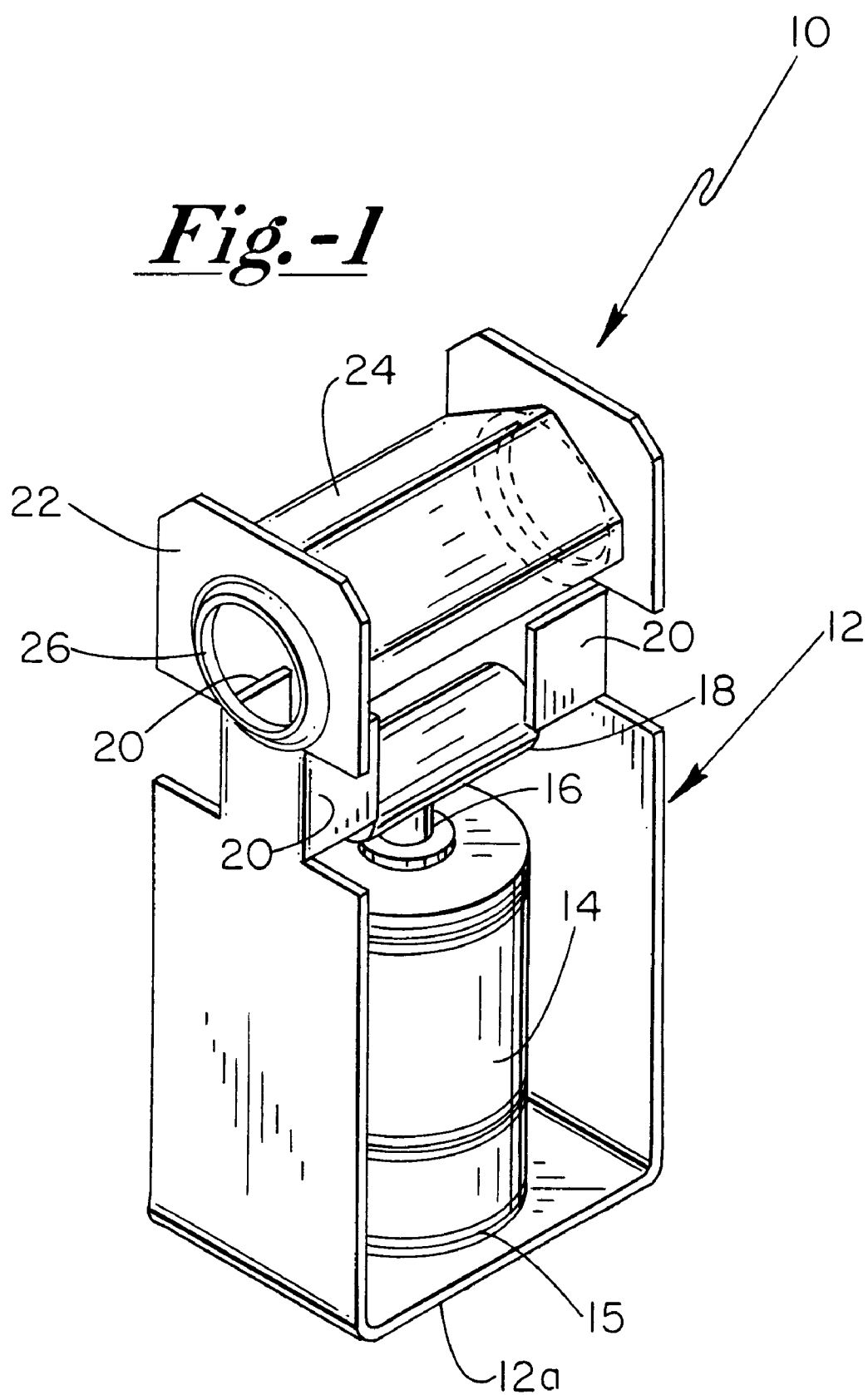

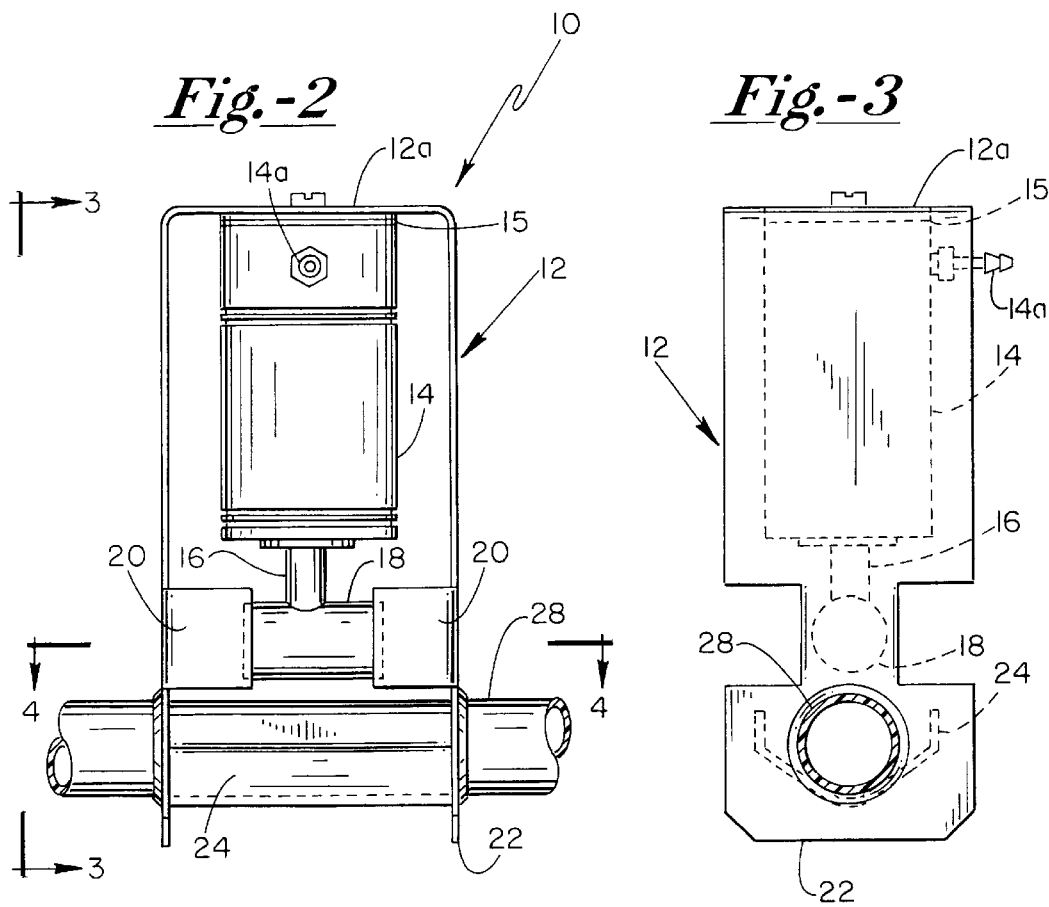
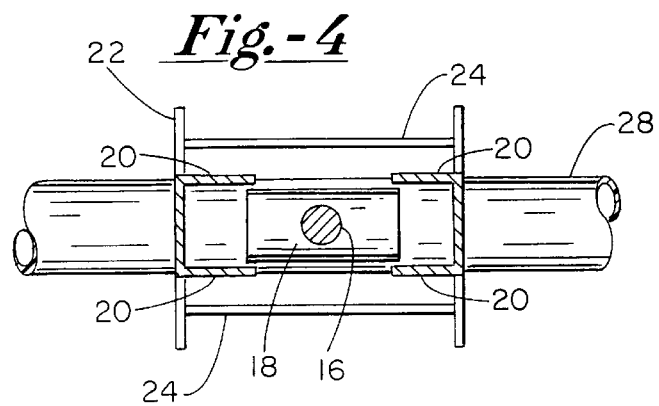

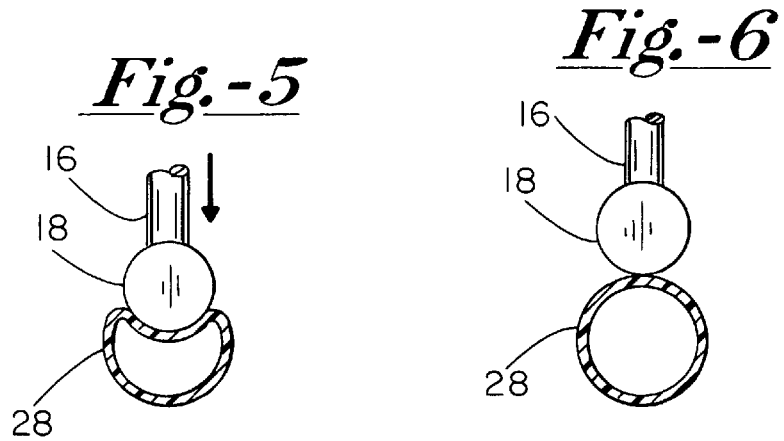
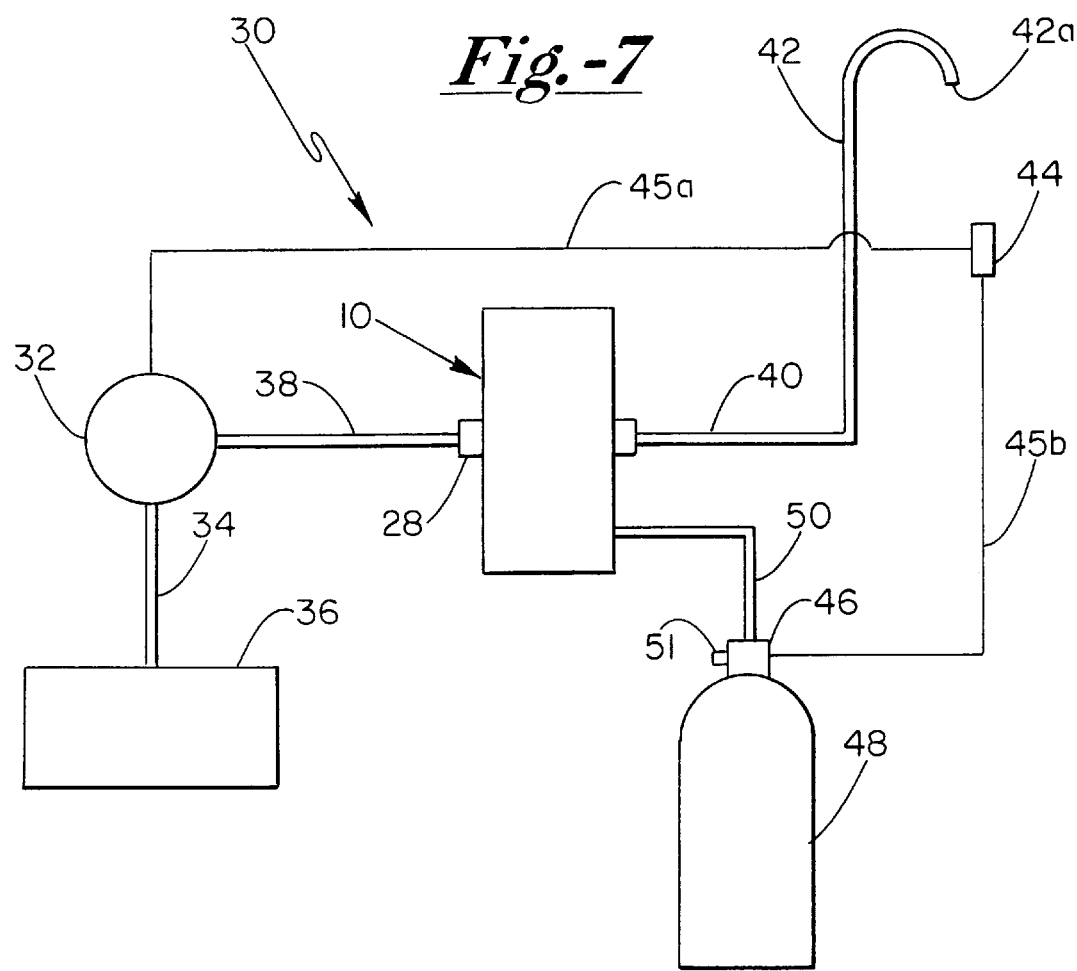

CHAMBER VALVE

This application claims the benefit of U.S. Provisional application Ser. No. 60/060,047 filed Sep. 25, 1997.

BACKGROUND OF THE INVENTION

1. Field of the Invention

The present invention relates generally to equipment for the dispensing of viscous materials, and more specifically to equipment for dispensing condiments.

2. Background

Various types of pumps are known for use in pumping viscous substances, such as diaphragm pumps and fixed and rotary peristaltic pumps. Condiments, such as ketchup and mustard, are well known examples of viscous products that are dispensed using such pumps as the driving force therefor. Automated dispensing systems for condiments are useful to save time in high volume applications such as are found "behind the counter" in fast food restaurants. These systems are also useful in self serve applications in place of, for example, individual packets and manual pump systems. The condiment packets can represent an environmental and cleanliness concern, and the manual pump systems may be activated too forcefully by an individual thereby resulting in waste and mess. Thus, a motorized pump system can provide the advantage of always delivering the condiment at a known predetermined flow rate thereby resulting in a more predictable, less wasteful and more cleanly condiment dispensing station. As such systems typically pump the condiments from bag-in-box containers, the overall approach is less susceptible to contamination and the frequency of refilling is less than in other dispensing approaches.

However, a problem with motorized condiment dispensing systems concerns the tendency for small amounts of condiment to drip from the delivery spout or point after dispensing thereof. Such dripping represents waste, and over time accumulates at the dispensing station requiring cleaning thereof. One approach to this problem has been to stop dispensing by stopping the pump and simultaneously fully occluding a flexible portion of hose through which the condiment is pumped to the dispense point However, condiment continues to remain at the dispense point and can nevertheless drip therefrom. A further approach has been to run the pump in the reverse direction after each dispensing, thereby sucking the condiment back away from the dispense point. However, this approach may not be possible depending on the type of pump employed, and in any event, requires that the pump be run an additional amount causing further wear thereon.

Accordingly, it would be desirable to have a means in conjunction with a motorized dispensing approach for viscous materials, such as condiments, that alleviates the problem of post dispensing dripping but that does not require the full occlusion of a tube or the further running of a pump.

SUMMARY OF THE INVENTION

The present invention concerns a valve, denoted a chamber valve, having a linear actuator operating a tube compression rod. The rod is held in a common axial orientation with a section of flexible tubing that runs through the valve and is rigidly held therein between the compression rod and a tube platen. The flexible tube section is fluidly connected on one end thereof to a pump that delivers condiment thereto from a source thereof. The opposite end of the flexible tube section is fluidly connected to the condiment dispense point.

In operation, the linear actuator is operable between an extended position wherein the compression rod moves to partially occlude or compress the flexible tube section against the tube platen, and a retracted position wherein the flexible tube section is not compressed. Condiment dispensing is commenced by actuation of a switch, such as a push buttoned, whereby the pump operates to move condiment. Specifically, the condiment is pumped thereby from its source to the chamber valve, through the flexible tube section thereof, and ultimately to the dispense point for dispensing therefrom. During such operation of the pump, the chamber valve is in its extended position wherein the flexible tube section is partially occluded. When sufficient condiment has been dispensed, the pump is turned off, typically be releasing the push button switch. The chamber valve is then operated to move to its retracted position. Those of skill will understand that such movement will result in the flexible tube section moving to its non-occluded position whereby a suction force is applied to the condiment. As a result thereof, a small volume of condiment is moved away from the dispense point in the reverse direction of its normal flow. Thus, the dripping of condiment existing at the dispense point is substantially eliminated. It was surprisingly found that the partial occlusion does not significantly affect dispensing flow and that the rebound of the flexible tube portion, from a position where such flow is not affected, is adequate to move condiment back from the dispense point sufficiently so that dripping is stopped.

DESCRIPTION OF THE DRAWINGS

A better understanding of the structure, and the objects, advantages and operation of the present invention can be had by reference to the following detailed description which refers to the following figures, wherein:

FIG. 1 shows a perspective view of the present invention.

FIG. 2 shows a front plan view of the present invention.

FIG. 3 shows side plan view of the present invention.

FIG. 4 shows a cross-sectional view along lines 3—3 of FIG. 1.

FIG. 5 shows a schematic representation of the flexible tube section with the linear actuator fully extended.

FIG. 6 shows a schematic representation of the flexible tube section with the linear actuator fully retracted.

FIG. 7 shows a schematic diagram of a condiment system in which the present invention can be employed.

DETAILED DESCRIPTION OF THE PREFERRED EMBODIMENT

The chamber valve of the present invention is seen in the various figures and referred to by the numeral 10. Valve 10 includes a rigid housing 12 to which a linear actuator 14 is secured to an end 12a thereof Linear actuator 14 in the present embodiment is pneumatically operated and includes a fitting 14a for connection to a regulated source of compressed gas. Of course, various other linear actuators, such as a solenoid, are known in the art. One or more spacing washers 15 can be removably secured between actuator 14 and housing end 12a. Actuator 14 includes a piston arm 16 to which is attached a tube compressing member or rod 18. Housing 12 includes two pairs of rod guiding flanges 20 and a lower housing portion 22. Lower housing portion 22 includes a U-shaped platen or channel 24 and a pair of tube receiving holes 26.

A flexible tube 28 extends through holes 26 and closely adjacent platen 24. As seen by referring to FIG. 7, chamber valve 10 can be used in the context of a condiment dispense system generally designated 30. System 30 includes a pump 32 having an inlet line 34 fluidly connected to a supply of condiment 36, supply 36 can, for example, be a tank or a bag-in-box container. An outlet line 38 delivers condiment to one end of flexible tube 28 and the opposite end of tube 28 is fluidly connected to a dispense line 40. Line 40 is, in turn, connected to a dispense faucet 42 having a dispensing end point 42a. A push button switch 44 is placed in the vicinity of faucet 42 and is electrically connected to pump 32 and to a two way solenoid valve 46 by lines 45a and 45b respectively. Valve 46 operates to alternately direct air from a compressed source 48 along a line 50 fluidly connected to fitting 14a of actuator 14, or to permit air in line 50 and actuator 14 to be exhausted to ambient through outlet 51.

In operation, when condiment is desired, button 44 is depressed. Pump 32 is then operated to draw condiment from supply 36 along line 34 to line 38. At the same time valve 46 is operated to direct air to actuator 14 to extend whereby rod 18 compresses tube 28 between it and U-shaped platen 24. As will be appreciated by those of skill, the amount of compression of tube 28 differs with respect to many variables. Including, the desired flow rate, the consistency and viscosity of the condiment, the inside diameter of tube 28, and the length of tubing compressed by rod 18. In one embodiment designed to pump ketchup at a flow rate of 10 grams per second, the inside diameter of tube 28 is 0.375 inch and the cross-sectional area was decreased approximately 50% with a rod 18 having a length of approximately 1.5 inch, thereby compressing a comparable length of tubing 28. Thus, in the on or flow state, condiment flows to, and is dispensed from, faucet 42 while tube section 28 is partially compressed. When sufficient condiment has been dispensed, the operator releases button 44 stopping the operation of pump 32 and operating valve 46 to exhaust air from line 50 and actuator 14. As a consequence thereof, dispensing of condiment ceases and actuator 14 retracts releasing the compression on tube 28 so that it returns to its non-compressed state as represented in FIG. 5. It will be appreciated by those of skill that as tube 28 rebounds to its normal cross-section due to the resiliency thereof, it creates a larger chamber space or volume therein, whereby a vacuum force is exerted resulting in an amount of condiment being sucked back from the dispense point end 42a of faucet 42. In this manner, any tendency of the condiment to drip from end 42a after dispensing is greatly reduced. It will be appreciated that the chamber valve 10 of the present invention can be used in conjunction with any dispense system regardless of the type of pump used. Also the various inlet and outlet lines could be rigid so long as tube 28 forms a portion of the total flow path in order to permit the sucking back of the pumped viscous substance as the tube 28 rebounds to its normal internal volume. Various suitable flexible plastic tubes are known in the art that can be repeatedly flexed but resist failure due to fatigue and working. Examples include, braided or non-braided silicone. Also, receiving holes 26 can be sized to be slightly smaller than the outside diameter of tube 28 so that it is firmly held in housing portion 22. Spacing washers 15 can be added or removed to vary the degree to which a tube 28 is compressed. In general, it is desirable to have valve 10 located relatively close to the dispense point so that its ability to move condiment in an upstream direction therefrom is sufficiently great. In the ketchup dispense system referenced above, valve 10 was located approximately 12 inches from the dispense point. In this regard, it will be appreciated by those of skill that a suction force could also be applied by valve 10 in an upstream direction towards pump 32. However, since a pump creates an essentially airtight situation and any condiment line upstream from valve 10 will generally be resistant to much deflection, that suction force will relieved more easily in the upstream direction from the dispense point as it is open to ambient air.

I claim:

1. A chamber valve for use in a system for dispensing a viscous substance, the viscous substance being moved by a pump from a source thereof to a dispense point, the chamber valve, comprising:
   a rigid housing,
   a linear actuator secured to the housing,
   a length of flexible tubing having opposite terminal ends secured to the housing between a rigid platen and a compressing member, one terminal end of the flexible tube for fluid connection to the pump and an opposite terminal end of the flexible tube for fluid connection to the dispense point, and the compressing member operable by the linear actuator to an extended position for partially compressing the tube against the platen while the pump is operating to pump the viscous substance through the flexible tube to the dispense point and a retracted position when dispensing is stopped so that a portion of the viscous substance is withdrawn from the dispense point into the tube.

2. A method of dispensing a viscous substance, comprising the steps of:
   pumping the viscous substance from a source thereof through a flexible tube having one terminal end for fluid connection to a pump and an opposite terminal end for fluid connection to a dispense point, partially compressing the tube to a reduced internal diameter while the pump is pumping the viscous substance through the tube and the reduced internal diameter to the dispense point, stopping the pumping of the viscous substance and substantially simultaneously removing the compressing of the tube so that it rebounds to a full internal diameter.

* * * * *